United States Patent [19]

Harman

[11] Patent Number: 5,727,099
[45] Date of Patent: Mar. 10, 1998

[54] POSITIONING SYSTEM FOR CONTROLLING OPTICAL ALIGNMENT OF OPTICAL WAVEGUIDES

[76] Inventor: Murray R. Harman, 90 Ashpark Crescent, Ottawa, Ontario, Canada, K1T 3N7

[21] Appl. No.: 698,750

[22] Filed: Jul. 19, 1996

[51] Int. Cl.$^6$ ................................................ G02B 6/26
[52] U.S. Cl. ........................... 385/52; 385/16; 385/19; 385/140
[58] Field of Search ........................... 385/16, 19, 23, 385/25, 31, 52, 56, 57, 97, 140

[56] References Cited

U.S. PATENT DOCUMENTS

| | | | |
|---|---|---|---|
| 4,645,294 | 2/1987 | Oguey et al. | 385/25 |
| 4,878,730 | 11/1989 | Wall | 385/140 |
| 5,016,978 | 5/1991 | Fargette et al. | 385/19 |
| 5,066,094 | 11/1991 | Takahashi | 385/140 |
| 5,239,599 | 8/1993 | Harman | 385/16 |
| 5,422,725 | 6/1995 | Vilhelmsson | 385/52 |
| 5,606,635 | 2/1997 | Haake | 385/53 |

*Primary Examiner*—Akm E. Ullah
*Assistant Examiner*—Hemang Sanghavi

[57] ABSTRACT

A positioning system is provided for controlling the optical alignment of optical waveguides. At least one optical waveguide is mounted to a first displaceable terminus and an opposite waveguide is mounted to a second terminus. A force can be applied to one of the termini so as to cause an essentially lateral (radial, pivotal etc.) misaligning movement of the end portion of the respective optical waveguide relative to the end portion of the opposite waveguide mounted to a second terminus, the end portions being separated by an air gap. The force required to move the displaceable terminus is provided by a first elastic member having a relatively low stiffness, such as a spring with a low spring constant. When exerted, the force is counteracted by a second elastic member, such as a spring having a higher stiffness, or spring constant, than the first elastic member. In an embodiment of the invention, the displaceable terminus may itself form a resilient member to which the first elastic member is connected for exerting the displacement force. When a large stiffness ratio between the elastic members is selected, it is possible to attain a very precise alignment control of the opposite optical waveguides by reducing the movement of relatively simple actuators such as hand-operated levers or lead-nut and lead-screw combinations into considerably finer movements of the displaceable terminus with the concomitant misalignment of the respective optical waveguide.

13 Claims, 9 Drawing Sheets

POSITIONING SYSTEM FOR CONTROLLING OPTICAL ALIGNMENT OF OPTICAL WAVEGUIDES

FIELD OF THE INVENTION

This invention relates to a positioning system for precisely manipulating the alignment of optical waveguides, the system useful in particular to realize an attenuation or switching function.

BACKGROUND OF THE INVENTION

Positioning systems are required in mechanical attenuators and switches of the type that are used in fiber optic systems. The majority of the attenuators and switches that are currently manufactured are mechanical devices. Of the known mechanical devices there are primarily two types: moving beam or moving fiber devices. The moving beam devices tend to be labour intensive having within them optic fibers that are terminated in polished tubes that are aligned and bonded to lenses. An expanded beam is then established between respective lenses and appropriate optical elements are inserted between the lenses to either attenuate, redirect or modify the light beam as required.

It is however possible to realize an attenuation or switching function by directly manipulating the position of adjacent ends of optical fibers. Such moving fiber devices offer the possibility of greatly reduced cost as they can be fabricated without the need for lenses.

An attenuator with a positioning system that utilizes resilient displacement of an end portion of optical waveguide for varying the end spacing of two opposite waveguides in an air-gap attenuator is described in U.S. Pat. No. 4,878,730 to Wall. The attenuator has fibers terminated in connector ferrules that are held in alignment in a flexible mating sleeve. The sleeve is engaged laterally with a screw and made to bend causing the fiber ends to separate. While the system provides significant mechanical reduction of motion of the screw movement when translated into the movement of the fiber ends, it relies on frictional retention of the ferrules to maintain long term alignment of the structure. The device would offer poor backreflection performance and be subject to interference effects due to the zero end face angle of the fibers.

U.S. Pat. No. 5,066,094 (Takahashi) shows a positioning system that provides relative axial movement between two angled connector ferrules by rotating a threaded section that causes one of the ferrules to slide axially while remaining rotationally keyed. Such a device would invariably have limited setability and stability as it endeavours to control sub-micron movements with a simple screw thread.

U.S. Pat. No. 5,239,599 to Harman teaches a moving fiber optical fiber switch. Two set screws are used to set the stop position of a pivoting lever arm. Although the device is termed a switch, it is possible to use it as a controllable attenuator by intentionally mis-adjusting the screws that control the stop positions of the lever arm. The Harman patent teaches a form of mechanical leveraging using a rigid lever arm that rotates in contact with a shaft member.

Although the above-mentioned prior art optical waveguide positioning systems provide a means of controlling waveguide movement in their intended applications, there is still a need for a compact, inexpensive positioning system offering high precision and flexibility of use.

STATEMENT OF THE INVENTION

In accordance with the invention, there is provided a positioning system for controlling the optical alignment of optical waveguides, the system comprising:

a first and second optical fiber termini, each of the termini including an optical waveguide, each of the waveguides having an end portion, the first and second termini adapted to be positioned in a confronting relationship such that opposite end portions of the optical waveguides associated with the first and second termini respectively are in axial alignment and are optically coupled so that an optical signal can be transmitted from one optical waveguide to the other, at least one of the termini being movable generally radially relative to the axial alignment of the waveguides, a first elastic means mounted to one of said termini and operable to impart on it a force acting to displace substantially laterally that terminus thereby changing the alignment of the opposite end portions of the optical waveguides, operating means for controllably operating the first elastic means to impart the force on the respective termini, and a second elastic means mounted to the same terminus as the first elastic member such as to counteract the force when imparted by the operating means through the first elastic means onto the terminus, wherein said first elastic means has a lower stiffness than said second elastic means.

In accordance with another aspect of the invention, there is provided a positioning system comprising one or more deformable elastic elements of relatively high stiffness to which one or more optical waveguides are fixedly mounted, said elastic element or elements of relatively high stiffness being such that a force applied in the required direction causes a deflection of said elastic element and a resultant movement of the fixedly mounted waveguide ends.

The elastic element of relatively high stiffness can take the form of a simple or multiple cantilever structure with a force applied in the axis of motion or a torque applied to its body about an axis that is orthogonal or at an angle to the axis of motion. The elastic element can also be shaped as a torsional element with a torque applied about its axis of rotation; an elastic element of relatively low stiffness is fixedly in contact either directly or indirectly through a secondary member attached to the relatively high stiffness elastic element and imparts directly or indirectly a force so as to cause movement of the relatively stiff elastic member. The force that the elastic element of relatively low stiffness imparts on the relatively high stiffness elastic element is varied by affecting its geometry by either, for example, extension in the case of a helical spring or by torsional displacement imparted to a torsional element. The free end of the elastic element of relatively low stiffness is connected to a movable reference object, for example a lead screw-nut assembly or a motorized movement stage for example, the lead screw being manually or motor driven.

The invention utilizes the principle of a frictionless elastic leveraging where mechanical motion advantage and increased resolution is obtained by placing two elastic elements of significantly different stiffness in a serial configuration.

For the purpose of the invention, "elastic" denotes also "resilient".

The term "terminus" and "termini" denotes a terminal part of a support structure for an optical waveguide or waveguides and is not limited to a single element.

BRIEF DESCRIPTION OF THE DRAWINGS

In the accompanying drawings

DETAILED DESCRIPTION OF THE INVENTION

Figure 1A:
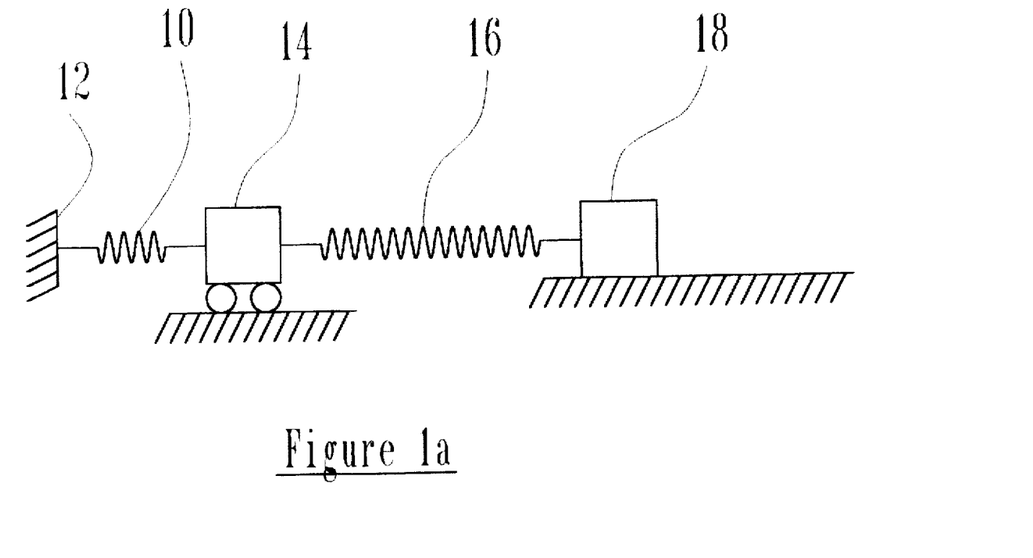
FIG. 1a is a schematic representation of the principle of the present invention, the positioning system being shown in a relaxed, full-transmission position.

As illustrated schematically in FIG. 1a, a positioning system of the invention has an elastic or resilient element of relatively high stiffness represented by a helical extension spring 10 one end of which is fixed to a stationary reference frame 12, while the other end is connected to a movable reference frame shown as a frictionless movable block 14. A second elastic element 16 of relatively low stiffness is also attached at one end to the block 14 and at the other end, to a movable block 18 which represents e.g. an actuator. FIG. 1a shows the system in a first, relaxed position wherein no force is applied onto the low-stiffness elastic element 16. The springs 10, 16 may be replaced by other elastic or resilient elements such as leaf springs, torsion springs or torsion rods.

Figure 1B:
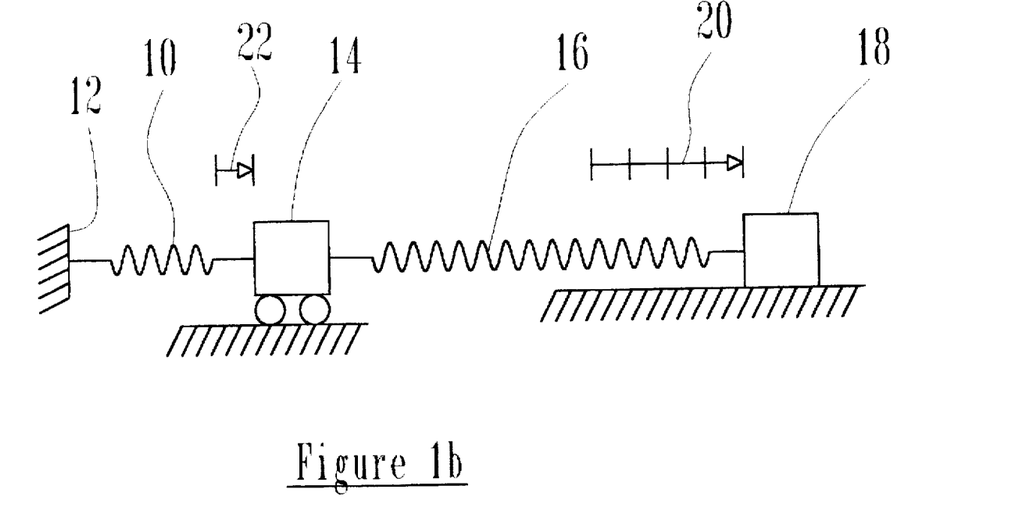
FIG. 1b is a schematic representation analogous to that of FIG. 1a wherein the positioning system is shown in an extended position.

FIG. 1b illustrates the system of FIG. 1a in operation. One can see the effect of what could be termed "elastic leveraging" of motion. As an example, the high-stiffness elastic element 10 has three times the relative stiffness of the low-stiffness element 16. When the movable block 18 is moved four units of distance 20 to the right, the frictionless movable block 14 moves only one unit of distance 22 to the right. The ratio of the two movements is the sum of the relative stiffnesses of the elements 10 and 16 divided by the stiffness of the lower-stiffness element 16. By selecting a large stiffness ratio for this system it is possible to achieve a significant reduction in movement and greatly increased resolution of position of the frictionless block 14 as compared to the movable block 18.

Figure 2:
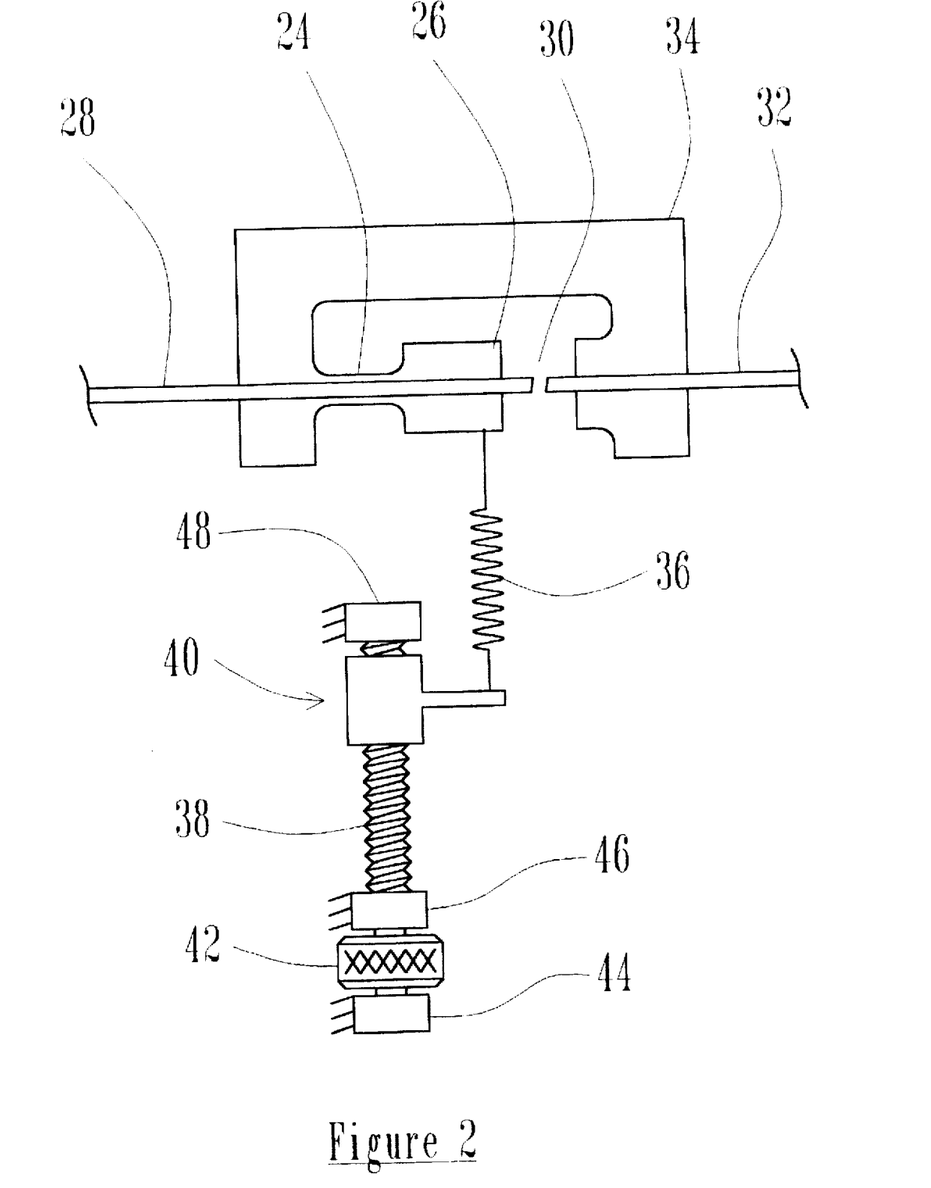
FIG. 2 is a top plan view of an optical attenuator utilizing an exemplary positioning system of the invention.

In an embodiment of the positioning system of the invention shown in FIG. 2, the relatively stiff elastic element 10 of FIGS. 1a and 1b is represented by a resilient thinned region 24 of a thicker support member 26 to which a left optical waveguide 28 is mounted, having its right end separated by an air gap 30 from the left end of an opposite right optical waveguide 32 that is mounted to a support frame 34.

A low-stiffness helical spring 36 is connected with one end to the support member 26 and with the other end, to a lead screw-nut assembly which consists of a lead screw 38, a nut 40, a thumb knob 42 and three support bearings 44, 46 and 48. In operation, with the correct sense of rotation, the thumb knob 42 can be turned to cause the nut 40 to move so as to extend the spring 36. The stiffness of the spring 36 is significantly smaller than the stiffness of the thinned region 24.

When the spring 36 is at a minimum extension, the ends of the optical waveguides 28, 32 are aligned so as to allow maximum transfer of optical energy across the air gap 30. As the low-stiffness spring 36 is being extended, it exerts an increasing force that acts on the cantilever 24, 26 causing it to deflect laterally thus increasingly misaligning the ends of the optical waveguides 28, 32 at the air gap 30.

By way of example, a single mode optical waveguide attenuator would require an optical waveguide misalignment, or offset, of about 0.001 inch to achieve a useful level of attenuation. For a linear movement of the nut 40 by one quarter of one inch, a stiffness ratio of about 250 to 1 would be required between the high and low stiffness elastic elements. A mechanical reduction of motion of about 250 times would represent a level of setability that could not be readily achieved with a lead screw and lead screw nut assembly alone.

It is possible to use waveguide support members of other geometries or shapes, e.g. by extending the thinned section 24 to replace the thicker section 26. Tapered and curved sections such as constant bending stress cantilever members or torsional members may be used as alternatives for the elastic/resilient high-stiffness element 10.

Figure 3:
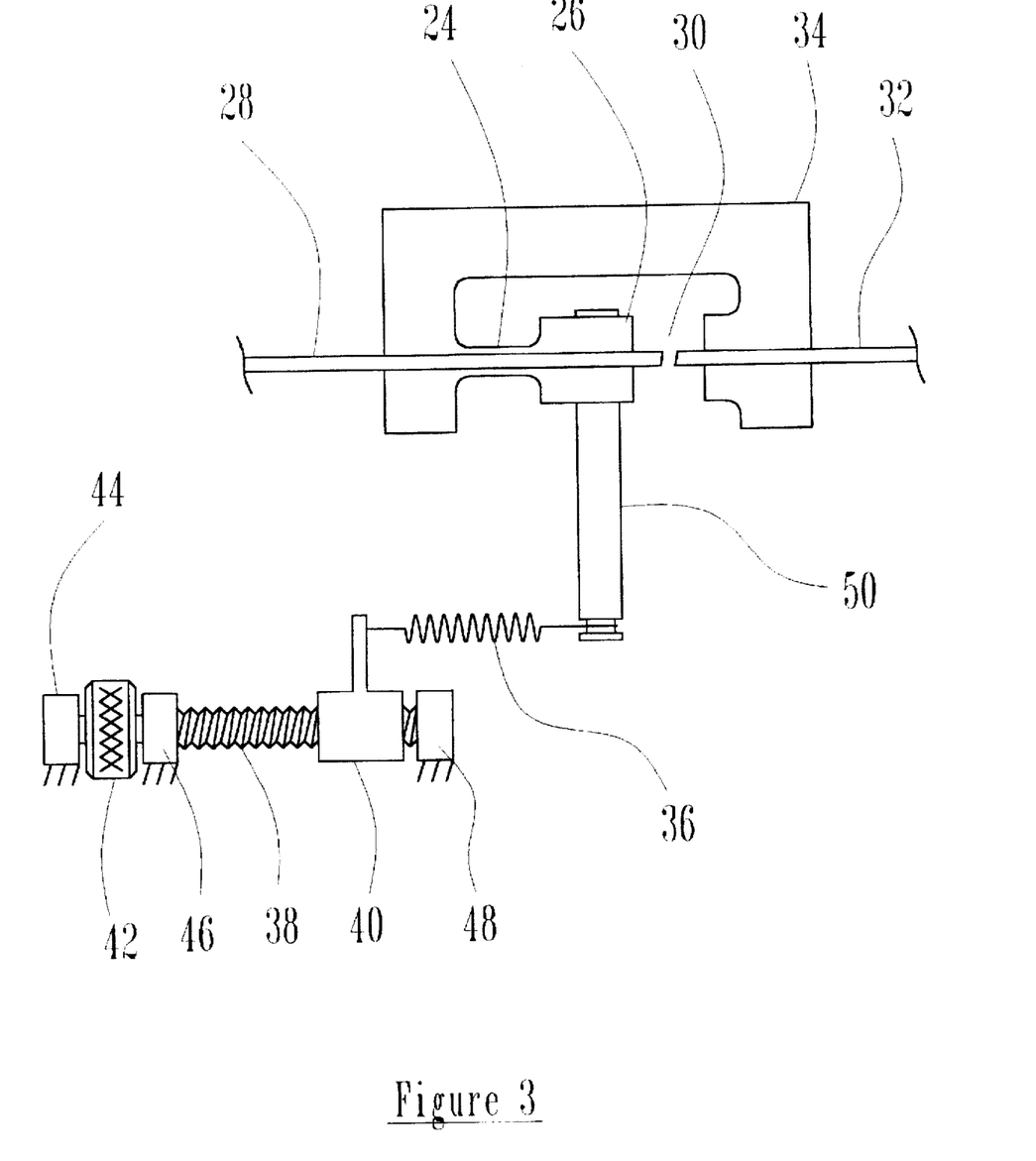
FIG. 3 is a top plan view of an optical attenuator utilizing another embodiment of the invention.

In the embodiment of FIG. 3, related to that of FIG. 2, the force generated by the low-stiffness helical extension spring 36 acts on a lever element shown as a rod 50 that is attached to the end section of the cantilever 24, 26. The lever element 50 generates a torque on the cantilever that causes a similar relative lateral displacement of the ends of optical waveguides 28, 32 at the air gap 30 as in FIG. 2.

Figure 4A:
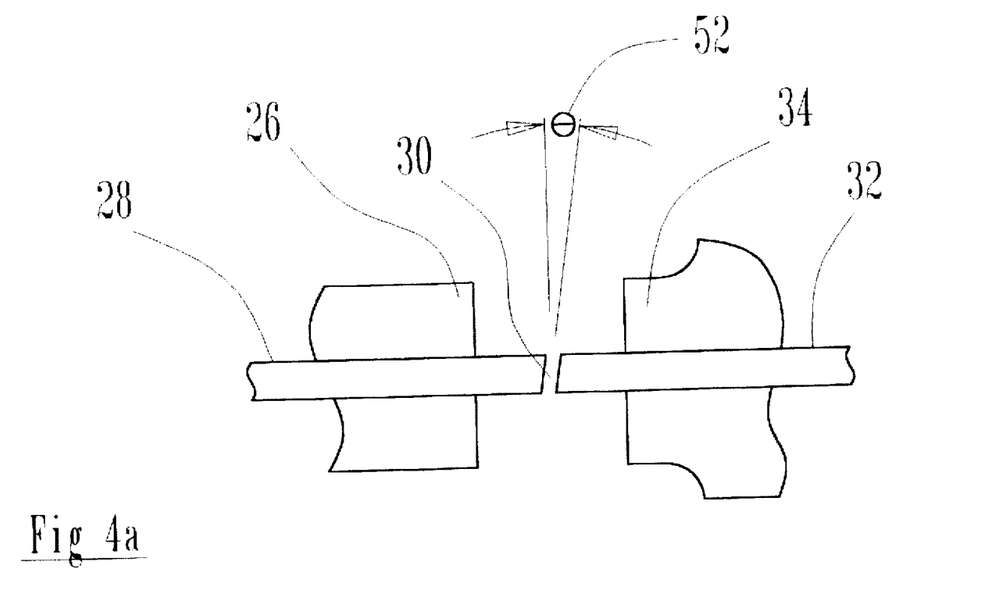
FIG. 4a is an enlarged view of the end portions of the waveguides of FIG. 3 in a position corresponding to a minimum attenuation of transmitted optical energy between the waveguides.

FIG. 4a shows a close-up view of the optical waveguide ends of FIG. 3 at an air gap 30 in an aligned state wherein light energy can pass easily from one waveguide to another across the air gap 30. The left 28 and right 32 optical waveguides can be formed out of one continuous waveguide by the insertion of a small air gap using e.g. a very narrow abrasive cutting blade, abrasive water sawing or laser cutting. The air gap would be of the order of one quarter to one half of the optical waveguide diameter to ensure minimum attenuation of light energy transmitted across the air gap 30 when the optical waveguides are in an aligned state. A typical waveguide would be about 125 microns in diameter while the air gap would be about 30 microns in diameter. In order to reduce the level of optical energy that is re-reflected into the source waveguide, it is customary and desirable to form the air gap at an angle 52 with respect to the longitudinal axis of the waveguide. A typical range of angles would be zero to about twelve degrees with six to eight degrees being common. It is possible to further minimize re-reflection (improve back-reflection) at the source fiber by displacing the air in the gap 30 between the waveguide ends with an index matching medium such as an index-matching gel or oil.

Figure 4B:
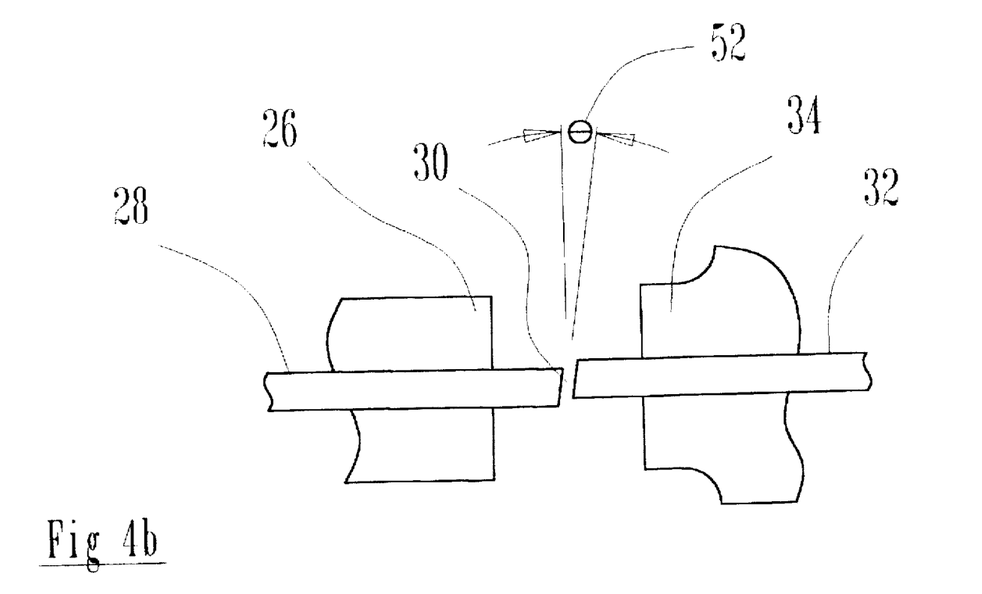
FIG. 4b is an enlarged view of the end portions of the waveguides of FIG. 3 in a position corresponding to a significant attenuation of transmitted optical energy between the waveguide.

FIG. 4b depicts a close-up view of the optical waveguide ends of FIG. 3 in a misaligned state corresponding to a significant level of attenuation of transmitted light energy within the waveguide as the light passes across the misaligned air gap 30. The relative misalignment of the optical waveguide ends is increased as a function of the extension of the helical spring 36, not shown in FIG. 4b.

It is also possible to reverse the direction of forces in this and other arrangements of the invention. For instance, the elastic element of relatively low stiffness (e.g. a helical extension spring 36) can be partly or fully extended by a corresponding rotation of the lead screw 38 and movement of the lead nut 40, and then a continuous optical waveguide can be affixed to the cantilever 24, 26 and the supporting frame 34. Next, the waveguide is sawn through to create an air gap 30. As a result, a decrease in extension of the helical spring 36 will cause an increase in relative misalignment of the optical waveguide ends at the air gap.

In another embodiment (FIG. 5a), the single "high-stiffness" cantilever element 24,26 of FIGS. 2 and 3 is replaced with a parallel or multiple cantilever assembly 54 comprised of four single cantilever elements 56. As a force, indicated by arrow 58, is applied to the end section 60 of the multiple cantilever assembly 54 by an elastic or resilient element of relatively low stiffness, not shown in FIG. 5a, a nearly ideal rectilinear motion will be imparted to the end section 60 of the "left" terminus. As a result, the end portions of the first left waveguide 62 and of the second left waveguide 64 would undergo nearly identical displacements as the force 58 applied to the end section 60 of the cantilever assembly 54 is varied. Given identical gap geometries and relative levels of misalignment of the respective optical waveguide ends at the air gaps 70, 72, the resulting level of attenuation in the two optical 50 waveguide paths (62-66 and 64-68) would be identical at similar wavelengths of optical energy within the respective optical waveguides.

Figure 5A:
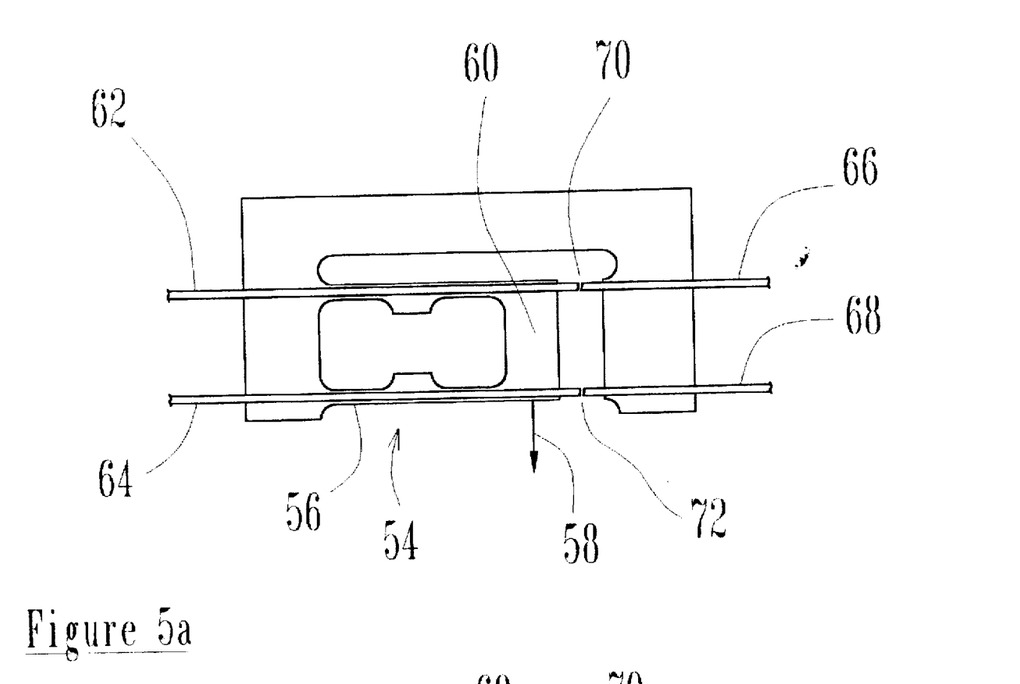
FIG. 5a is a partial illustration of another embodiment employing a multiple cantilever assembly.
Figure 5B:
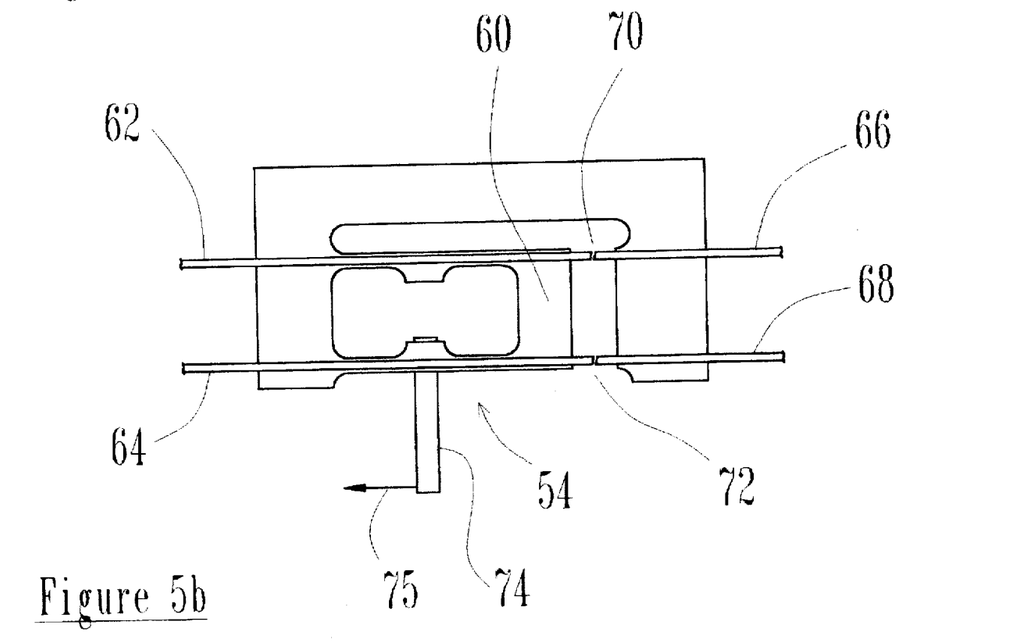
FIG. 5b is an illustration, analogous to FIG. 5a, of another embodiment using a multiple cantilever assembly.

It is possible to use the invention with more than two optical waveguide paths. For example, two or more parallel optical waveguides can be placed beside one another where a single waveguide is shown in FIGS. 2a–5b. The positioning system shown in FIG. 3 as a single waveguide attenuator can thus be realized as e.g. a dual waveguide attenuator by mounting two continuous optical waveguides substantially beside each other and sawing through both of them during the same manufacturing operation. It is preferable, although not necessary, to use a dual cantilever assembly as shown in FIGS. 5a and 5b instead of a simple cantilever element as shown in FIGS. 2 and 3 to design a dual waveguide attenuator. Due to the geometry of their respective movements as they are displaced, the two left optical waveguide ends of FIGS. 5a and 5b would track each other's movement with more accuracy than the two left optical waveguide ends placed substantially beside each other on a simple cantilever structure as shown in FIGS. 2 and 3. In the latter arrangement, one air gap would increase in spacing while the other would decrease. Since end spacing is a parameter that affects the level of attenuation of optical energy transmitted across an air gap, such a non-uniformity in relative waveguide misalignment between respective optical paths, would reduce the accuracy of the tracking in terms of attenuation between said two optical waveguide paths.

As an alternative to FIG. 5a, the system of FIG. 5b employs a lever member 74, analogous to the element 50 of FIG. 3, attached to one of the thick central sections of the dual cantilever assembly 54. When acted upon by a force 75, the rod-shaped lever member 74 applies a torque to the dual cantilever assembly resulting in a similar motion of the end section 60 of the dual cantilever 54 as in the embodiment of FIG. 5a. The force 75 is again provided by an elastic or resilient element of relatively low stiffness such as a helical extension spring, not shown in FIG. 5b. The extension and resultant force of the extension spring can be controlled by a lead screw and nut assembly as shown in FIGS. 2 and 3 or by other movement control means.

Figure 6:
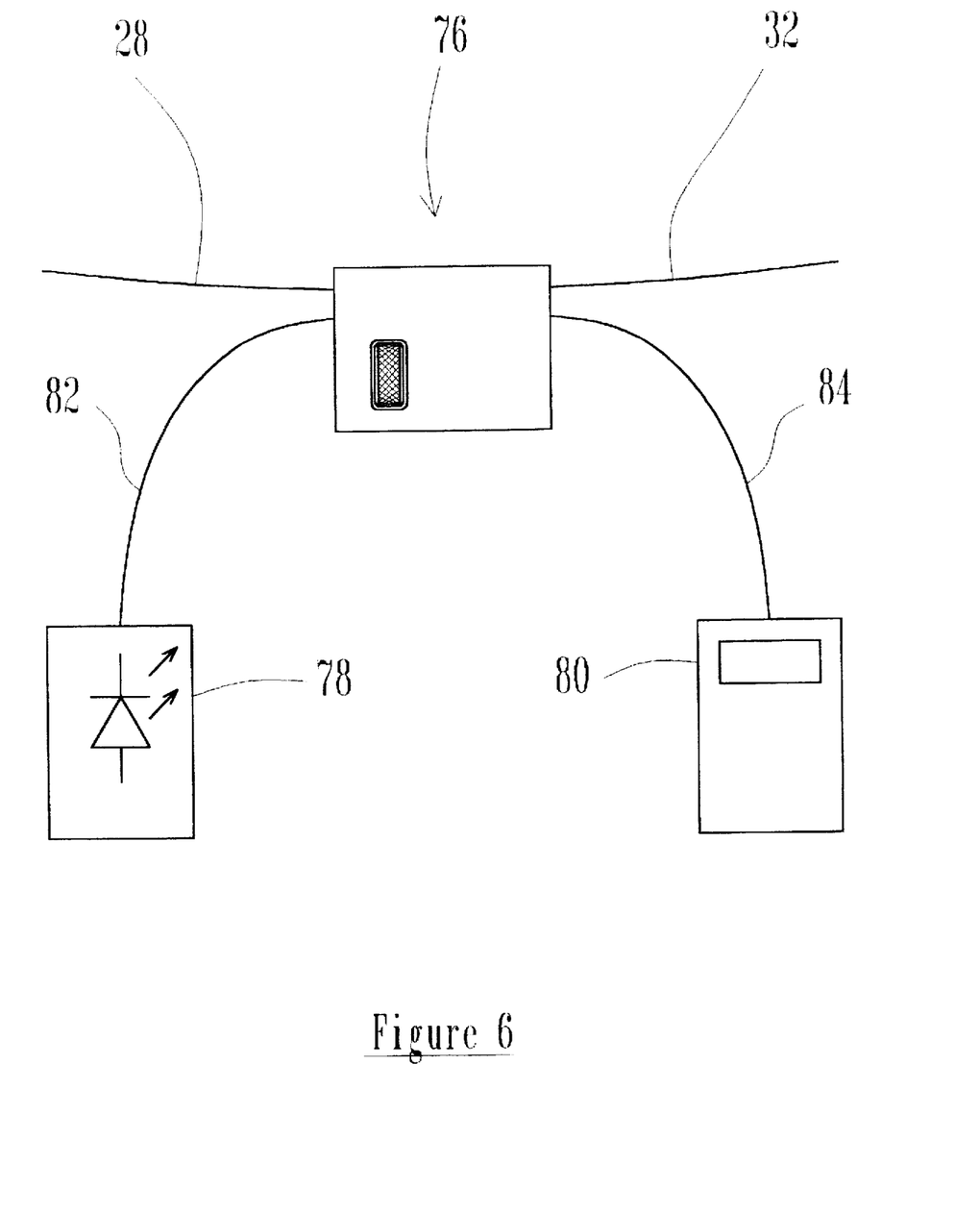
FIG. 6 depicts a dual optical waveguide attenuator having one of the waveguides connected to a source of optical energy and a detector to measure the level of transmitted optical energy.

FIG. 6 shows a dual optical waveguide attenuator 76 employing preferably a positioning system as shown in FIGS. 5a or 5b. A calibrated attenuation level in a useable optical waveguide path 28, 32 can be inferred by connecting a source of optical waveguide 78 and an energy level detection means 80 to the other matching optical waveguide path 82, 84. If the wavelength of the optical waveguide radiated by the source 78 and received by the detection means 80 is identical to the wavelength of the optical waveguide transmitted within the other optical waveguide, or if a known compensation is added for the difference of wavelengths, then a calibrated optical waveguide attenuator is realized provided that the two optical waveguide paths have similar attenuation characteristics. It is also possible to use the arrangement of FIG. 6 with more than two optical waveguide paths to provide more than one useable optical waveguide path with a known inferred level of attenuation.

Figure 7:
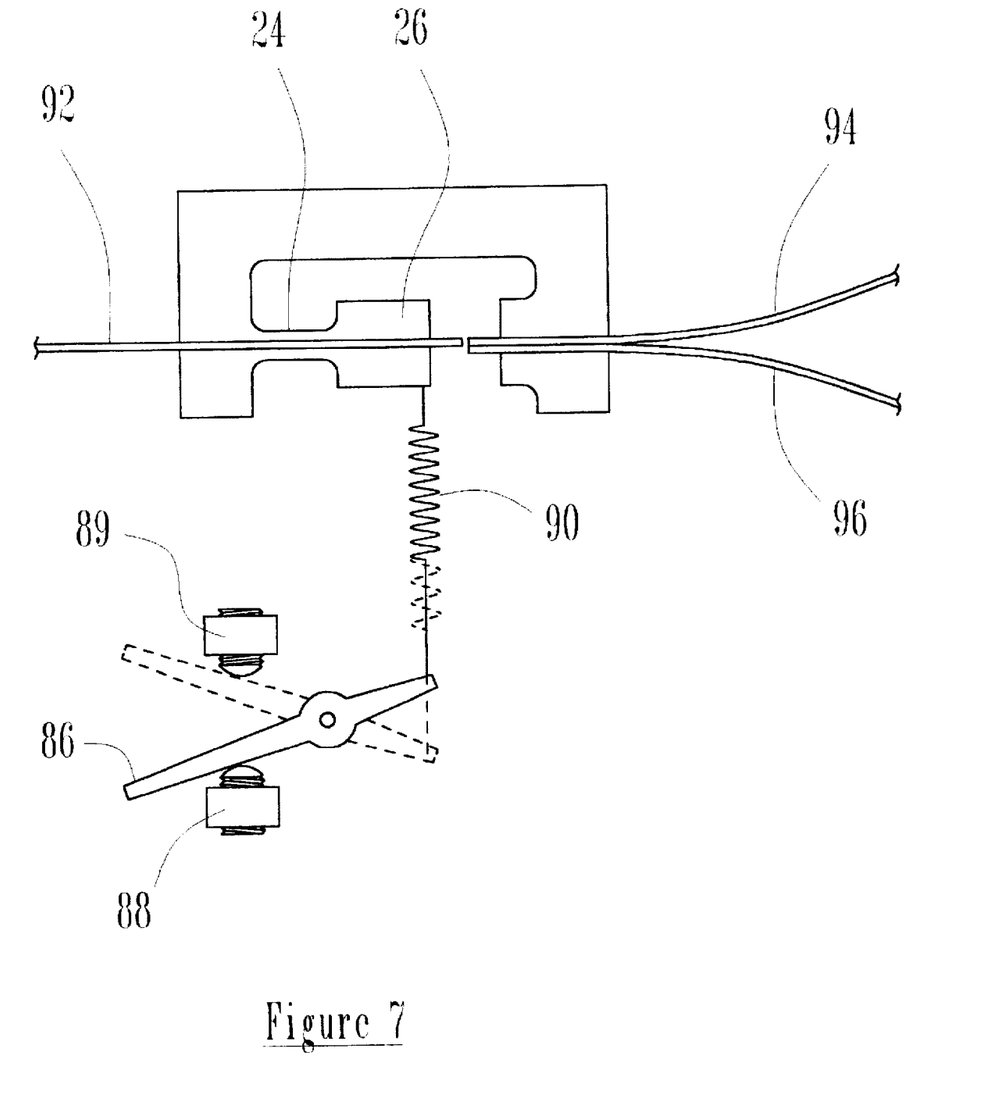
FIG. 7 shows another embodiment of the positioning system having a toggle lever with adjustable end stops.

In FIG. 7, a one-input-to-two-output, 1×2, moving optical waveguide switch is shown wherein optical waveguide is re-routed from one optical waveguide path to another. The lead screw-nut assembly 38, 40 of FIGS. 2 and 3 has been replaced with an alternative movement control means embodied by a toggle member 86. The member 86 can be latched 55 in one of two stop positions, one of them being indicated in phantom lines. The stop positions are settable by means of adjustment screws 88, 89. A helical extension spring 90 of relatively low stiffness is affixed to the toggle 86 while the other end of the spring 90 is connected to the thicker portion of a single cantilever element 24, 26 similar to that of FIGS. 2 and 3. A change of the position of the toggle 86 to the alternate end position (in phantom lines) causes an elongation of the spring 90 causing a concomitant tensile force acting onto the thick end portion 26 of the cantilever element 24, 26. This force causes a lateral displacement of the cantilever 24, 26. As a result, the right end portion of the optical waveguide 92 that is affixed to the cantilever 24, 26 also moves in a lateral manner (which is to be understood also as pivotal, radial, or related motion). The stiffness of the narrowed, resilient portion 24 of the cantilever element and of the spring 90 are chosen such that the movement of the right end portion of the left optical waveguide 92 caused by the toggle being positioned in either end position, ensures alignment with either a first right optical waveguide 94 or a second right waveguide 96 respectively.

Figure 8A:
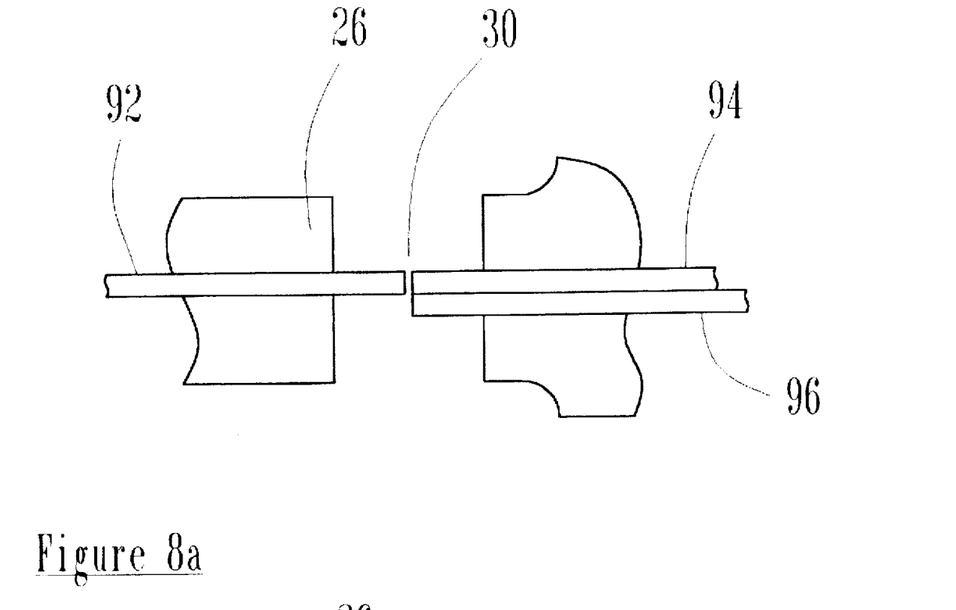
FIG. 8a is an enlarged partial view of FIG. 7 showing the optical waveguide ends with the lever in the "down" position.
Figure 8B:
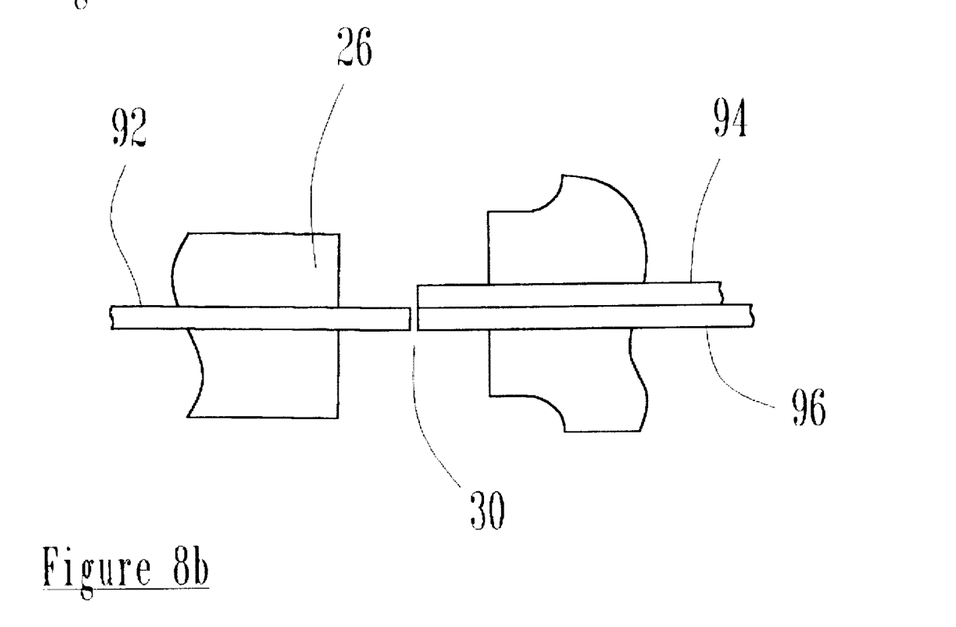
FIG. 8b is an enlarged view of the FIG. 7 showing the optical waveguide ends with the lever in the "up" position.

FIGS. 8a and 8b show enlarged views of the optical waveguide ends of FIG. 7 when the left end of the toggle is in the lower end position or the upper end position respectively. The final alignment of the end portion of the left optical waveguide 92 and the right end of the right upper optical waveguide 94 (FIG. 8a) can be adjusted using the lower adjustment screw 88 to ensure maximum optical waveguide transfer across the air gap 30 between the optical waveguide ends.

As shown in FIG. 8b, the final alignment of the end portion of the left optical waveguide 92 and the end portion of the right lower optical waveguide 96 can be adjusted using the upper adjustment screw 89.

Figure 9:
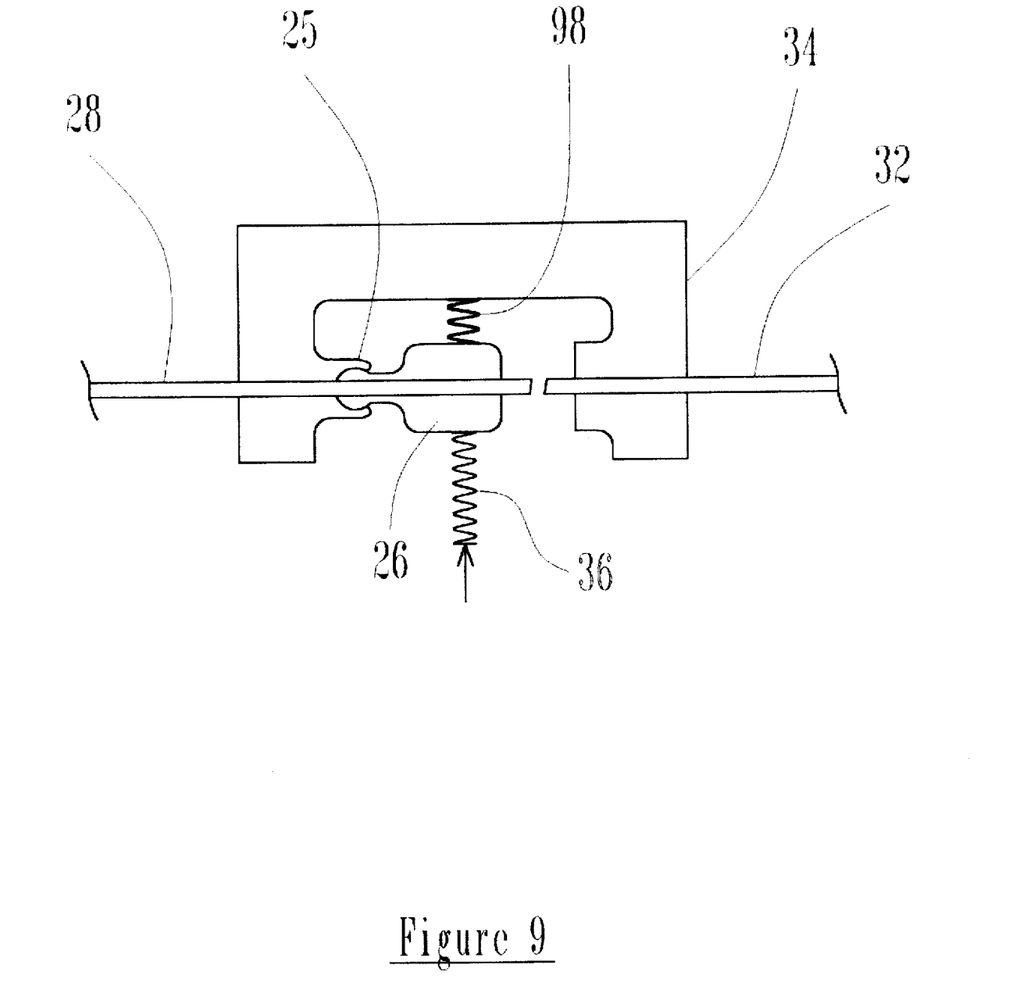
FIG. 9 is a partial view of an alternative embodiment of the system of the invention.

As an alternative to the embodiment of FIG. 2, FIG. 9 presents a system in which the resilient thinned section 24 of FIG. 2 is replaced by a spring 98 attached to the cantilever 26 and to the support frame 34. The thinned resilient portion 24 of FIGS. 2 and 3 may be replaced by a pivot 25. In operation, the spring 98, of higher stiffness than the spring 36, would counteract the force, as indicated by the arrow, exerted on the spring 36 and upon the member 26 by the spring 36, with the resulting precise misaligning motion of the respective ends of the opposite waveguides 28, 32.

The embodiment of FIG. 9 may be of course modified e.g. by the addition of the lever member 50 of FIG. 3. It may also be modified by combining it with the dual cantilever design of FIGS. 5a or 5b. It will be appreciated that the thinned cantilever design of FIGS. 2, 3, 5a, 5b and 7 may offer simplicity and cost saving compared to the embodiment of FIG. 9.

By selecting the elastic or resilient elements with appropriate stiffness, one can select a range of motion of the positioning system of the invention as required for a given application. This allows the positioning system to be used for either a moving waveguide attenuator or a moving waveguide switch.

It is preferable that the movable elements i.e. the elastic members, were movable in a substantially frictionless manner to enhance repeatability of the settings and, to a large degree, prevent hysteresis of the material.

The system of the invention is intended primarily to provide very small movements of opposite waveguides, of the order of the diameter of a typical waveguide or less. As a result, with sound design practices is possible to utilize extremely small, low mass, moving elements. This allows the critical a"free sprung" resonances of the positioning system to be kept very high in frequency where they do not affect the position stability of the positioning system.

Various modifications within the spirit of the invention may occur to those versed in the art. For instance, the elastic elements may be mounted so as to act upon not one, but both opposing termini and thus cause the misaligning or aligning motion of both opposite waveguides simultaneously. Such modifications are intended to constitute part of the invention which is defined by the appended claims.

I claim:

1. A positioning system for controlling the optical alignment of optical waveguides, the system comprising:

a first and second optical fiber termini, each of said termini including an optical waveguide, each of said waveguides having an end portion, said first and second termini adapted to be positioned in a confronting relationship such that opposite end portions of said optical waveguides associated with said first and second termini respectively are in axial alignment and are optically coupled so that an optical signal can be transmitted from one optical waveguide to the other, at least one of said termini being movable generally radially relative to said axial alignment, first elastic means mounted to said one of said termini and operable to impart thereon a force acting to displace substantially laterally said one of said termini thereby changing the alignment of said opposite end portions of said optical waveguides, operating means for controllably operating said first elastic means to impart said force on said one of said termini, and second elastic means mounted to said one of said termini such as to counteract said force when imparted by said operating means through said first elastic means, wherein said first elastic means has a lower stiffness than said second elastic means.

2. The positioning system of claim 1 wherein said second elastic means are means for holding said opposite end portions of said waveguides in said axial alignment when no force is imparted through said first elastic means on said one of said termini.

3. The positioning system of claim 1 wherein said first elastic means is an extendable spring.

4. The positioning system of claim 1 wherein said second elastic means is a resilient part of said one of said termini.

5. The positioning system of claim 1 wherein said one of said termini is a resilient cantilever member.

6. The positioning system of claim 1 wherein said one of said termini is a multiple cantilever assembly having at least two cantilever members coupled mechanically for a simultaneous movement under the action of said force.

7. The system of claim 1 wherein said operating system comprises a lead screw and a nut threadably associated with, and axially movable relative to, said lead screw.

8. The positioning system of claim 1 wherein said first and second termini each includes at least one waveguide having an end portion, wherein said first and second termini are adapted to be positioned in a confronting relationship such that at least one end portion of said waveguide associated with said first terminus is optically coupled with the end portion of an optical waveguide associated with said second terminus.

9. The system according to claim 1 wherein said operating means comprise a toggle lever with two stop members for controlling and limiting respective end positions of said toggle lever.

10. A positioning system for controlling the optical alignment of optical waveguides, the system comprising:

a first and second optical fiber termini, each of said termini including at least one optical waveguide, each of said waveguides having an end portion, said first and second termini adapted to be positioned in a confronting relationship such that at least two opposite end portions of said optical waveguides associated with said first and second termini respectively are in axial alignment and are optically coupled so that an optical signal can be transmitted from one optical waveguide to the other, a spring mounted to said first terminus for imparting a force thereon, an actuator for controllably operating said spring to impart said force on said first terminus, wherein said first terminus comprises a resilient member the stiffness of said member being higher than the stiffness of said spring, said first terminus being disposed to be movable generally radially relative to said confronting relationship when acted upon by said tensile force.

11. The system of claim 10 wherein said actuator is a lead screw and a nut associated threadably with said lead screw and axially movable relative thereto, said nut being connected to said first elastic member.

12. The system according to claim 10 wherein said actuator comprises a toggle lever with two stop members for controlling and limiting respective end positions of said toggle lever.

13. The system according to claim 10 wherein said spring is an extendable spring.

* * * * *